(12) United States Patent
Miyakawa et al.

(10) Patent No.: US 7,044,525 B2
(45) Date of Patent: May 16, 2006

(54) AUTOMOTIVE EXTRUSION-MOLDED PRODUCT AND MANUFACTURING METHOD THEREFOR

(75) Inventors: Naohisa Miyakawa, Shiroi (JP); Katsuhisa Kato, Moriya (JP)

(73) Assignees: Tokiwa Chemical Industries Co., Ltd., Chiba (JP); System Technical Co., Ltd., Ibaragi (JP)

( * ) Notice: Subject to any disclaimer, the term of this patent is extended or adjusted under 35 U.S.C. 154(b) by 113 days.

(21) Appl. No.: 10/687,777

(22) Filed: Oct. 20, 2003

(65) Prior Publication Data

US 2004/0081796 A1 Apr. 29, 2004

(30) Foreign Application Priority Data

Oct. 22, 2002 (JP) ............................. 2002-343062
May 12, 2003 (JP) ............................. 2003-170060

(51) Int. Cl.
*E06B 7/16* (2006.01)
*B60J 10/08* (2006.01)

(52) U.S. Cl. .................. 296/1.08; 296/146.9; 49/490.1
(58) Field of Classification Search .............. 296/1.08, 296/93, 154, 146.9; 49/502, 498.1, 490.1; 277/637, 641, 652, 921
See application file for complete search history.

(56) References Cited

U.S. PATENT DOCUMENTS

| 3,167,856 A | * | 2/1965 | Zoller | 29/413 |
| 3,222,769 A | * | 12/1965 | Le Plae | 29/413 |
| 3,455,018 A | * | 7/1969 | Collins | 29/527.1 |
| 5,249,353 A | * | 10/1993 | Kranz | 29/446 |
| 6,047,872 A | * | 4/2000 | Kii et al. | 225/97 |

* cited by examiner

*Primary Examiner*—D. Glenn Dayoan
*Assistant Examiner*—Greg Blankenship
(74) *Attorney, Agent, or Firm*—Wenderoth, Lind & Ponack, L.L.P.

(57) ABSTRACT

An automotive extrusion-molded product includes a core material (2) having a U-shaped cross section which is made of a hard synthetic resin. The core material has cut portions (7, 8) with various shapes extending in the lengthwise direction. A coating body (3) made of a soft synthetic resin is adhered to the core material so as to cover the core material. The coating body (3) is provided with a pushed-in portion (5) formed integrally with the coating body and extending downward beyond the end portion (4, 4) of the core material so as to be pushed in toward an inner peripheral surface (14) having a U-shape cross section of the core material. The pushed in portion (5) is provided with a plurality of holding members (6, 6) which project to the outside of the pushed-in portion and are disposed so as to opposed to each other within a space formed by the inner peripheral surface having a U-shape cross section of the core material when the pushed-in portion is pushed into the space formed by the inner peripheral surface of the core material.

21 Claims, 9 Drawing Sheets

AUTOMOTIVE EXTRUSION-MOLDED PRODUCT AND MANUFACTURING METHOD THEREFOR

BACKGROUND OF THE INVENTION

1. Field of the Invention

The present invention relates to an automotive extrusion-molded product such as a trim, weather strip, and window molding that is used at a vehicle body opening such as an automotive door, trunk, and window, and a manufacturing method therefor.

2. Description of Related Art

Conventionally, as an extrusion-molded product of this type such as trim, weather strip, and window molding that is used at a vehicle body opening of an automobile, a metallic core material formed with fishbone-shaped cut portions has been used. The conventional automotive extrusion-molded product is manufactured by a process described as follows. First, the fishbone-shaped cut portions are punched out from the metallic core material having a cross-sectional shape of a flat plate, and then by extrusion-molding synthetic resin, rubber, or the like, a coating layer and holding members are formed on the flat-plate metallic core material having the cut portions. Subsequently, the product is bent substantially into a U shape in the cross section.

As environmental problems have become serious in recent years, in order to make the metallic core material light in weight and able to be recycled, it is desired to change the material to hard synthetic resin. However, when the hard synthetic resin core material is produced with the flat plate in the same way as that for the metallic core material, it is very difficult to bend the material into a U shape in the cross section. Therefore, a synthetic resin core material is extrusion-molded into a U shape in advance, and the cut portions of difficult shapes are formed by a punching machine, by which a synthetic resin core material having cut portions is formed. Subsequently, by extrusion-molding, a coating body is attached on the outer periphery of the synthetic resin core material having a U shape in the cross section, and a plurality of opposed holding members for pressing, which are used to hold a flange of vehicle body opening of an automobile, are formed on the inside surface of the core material having the U-shaped cross-section.

However, in order to increase a holding force of the holding members with respect to a flange of a vehicle body opening of an automobile, it is necessary to surely decrease the spacing between the opposed holding members, which presents a serious problem in that it is difficult to extrusion-mold the holding members having a desired shape on the inner peripheral surface substantially having a U-shaped cross section because the spacing is narrow.

SUMMARY OF THE INVENTION

It is an object of the present invention to provide an automotive extrusion-molded product in which holding members having a desired shape can be disposed easily and surely in a narrow space formed by an inner peripheral surface of a core material having a U-shaped cross section.

It is another object of the present invention to provide an automotive extrusion-molded product in which the core material is made light in weight and able to be recycled by using a synthetic resin core material having a U-shaped cross section which has cut portions having various shapes.

It is still another object of the present invention to provide an automotive extrusion-molded product which can firmly hold a flange of vehicle body opening of an automobile by the holding members having a desired shape disposed within a space formed by the inner peripheral surface having a U-shaped cross section of the synthetic resin core material.

It is still another object of the present invention to provide a manufacturing method for an automotive extrusion-molded product, which can form the holding members having a desired shape disposed within a space formed by the inner peripheral surface having a U-shaped cross section of the synthetic resin core material simply and easily by extrusion-molding a coating body made of a synthetic resin on the synthetic resin core material so as to cover the core material from the outside.

It is still another object of the present invention to provide a manufacturing method for an automotive extrusion-molded product, which can integrally manufacture the extrusion-molded product in a continuous process easily at a low cost by extrusion-molding the synthetic resin core material into a U-shaped cross section, and by extrusion-molding the synthetic resin coating body having the holding members and a pushed-in portion on the core material.

According to the present invention, an automotive extrusion-molded product such as a trim, weather strip, and window molding which is used at a vehicle body opening such as an automotive door, trunk, and window of an automobile comprises a core material having a U-shaped cross section which is made of a hard synthetic resin, the core material having cut portions with various shapes and extending in the lengthwise direction, and a coating body made of a soft synthetic resin, which is adhered to the core material so as to cover the core material from the outside. The coating body is provided with a pushed-in portion which is formed integrally with the coating body and extends downward beyond the end portion of the core material so as to be able to be pushed in toward an inner peripheral surface having a U-shaped cross section of the core material. The pushed in portion is provided with a plurality of holding members which project to the outside of the pushed-in portion and are disposed so as to be opposed to each other within a space formed by the inner peripheral surface having a U-shaped cross section of the core material when the pushed-in portion is pushed into the space formed by the inner peripheral surface of the core material.

According to the present invention, a manufacturing method for an automotive extrusion-molded product such as a trim, weather strip, and window molding which is used at a vehicle body opening such as an automotive door, trunk, and window of an automobile includes the steps of extrusion-molding a synthetic resin core material having a U-shaped cross section in a first die by using a first extruder into which a hard synthetic resin is poured; cooling the synthetic resin core material having a U-shaped cross section by causing the core material to pass through a cooling tank; punching out cut portions having various shapes from the synthetic resin core material having a U-shaped cross section by using a punching machine; and extrusion-molding a coating body, a pushed-in portion connected to the coating body, and a plurality of holding members projectingly provided on the outside of the pushed-in portion integrally in a second die by using a second extruder into which a soft synthetic resin is poured.

DETAILED DESCRIPTION OF THE PREFERRED EMBODIMENTS

Figure 1:
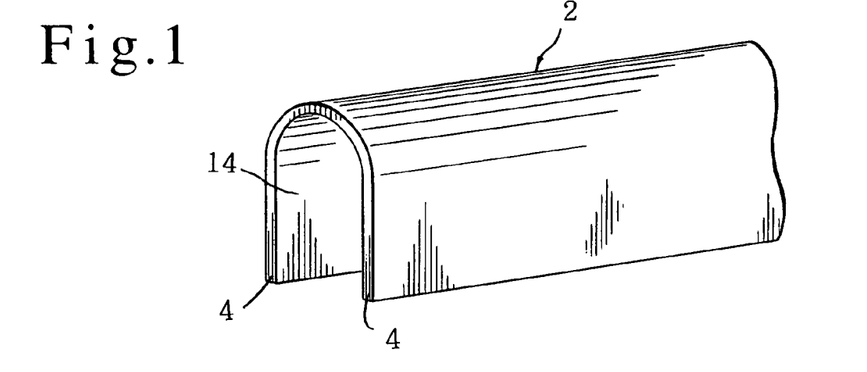
FIG. 1 is a perspective view of a synthetic resin core material having a U-shaped cross section in accordance with the present invention.
Figure 2:
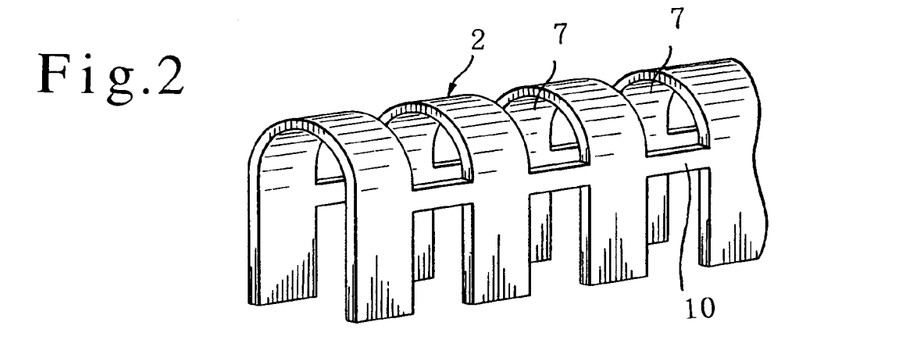
FIG. 2 is a perspective view of a synthetic resin core material in accordance with the present invention, in which cut portions are formed at fixed intervals.
Figure 3:
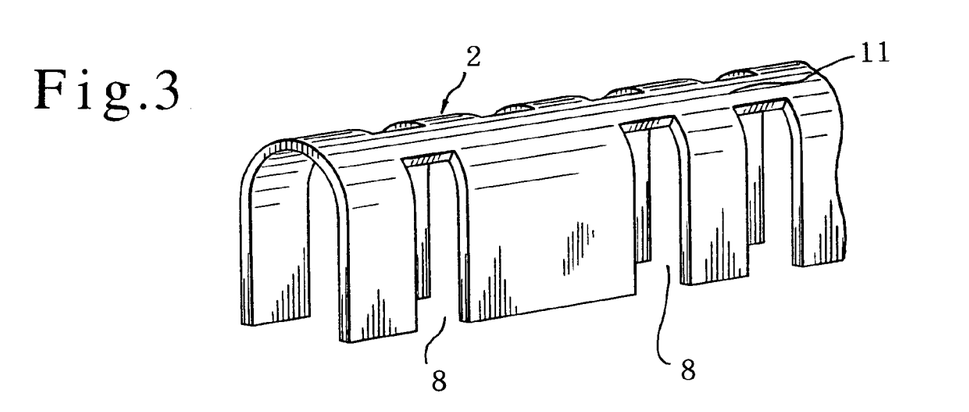
FIG. 3 is a perspective view of a synthetic resin core material in accordance with the present invention, in which cut portions are formed at uneven intervals.

Embodiments of an automotive extrusion-molded product in accordance with the present invention will be described with reference to the accompanying drawings. FIGS. 1 to 3 show a synthetic resin core material 2 in accordance with the present invention. The core material 2 is formed by extrusion-molding a hard synthetic resin into a U shape in the cross section, and the core material 2 having a U-shaped cross section has an inner peripheral surface 14 on the inside of both end portions 4, 4. In the core material 2, cut portions 7 are punched out at equal intervals with a connecting portion 10 being left as shown in FIG. 2, or cut portions 8 are punched out in uneven intervals with a connecting portion 11 being left as shown in FIG. 3.

Figure 4:
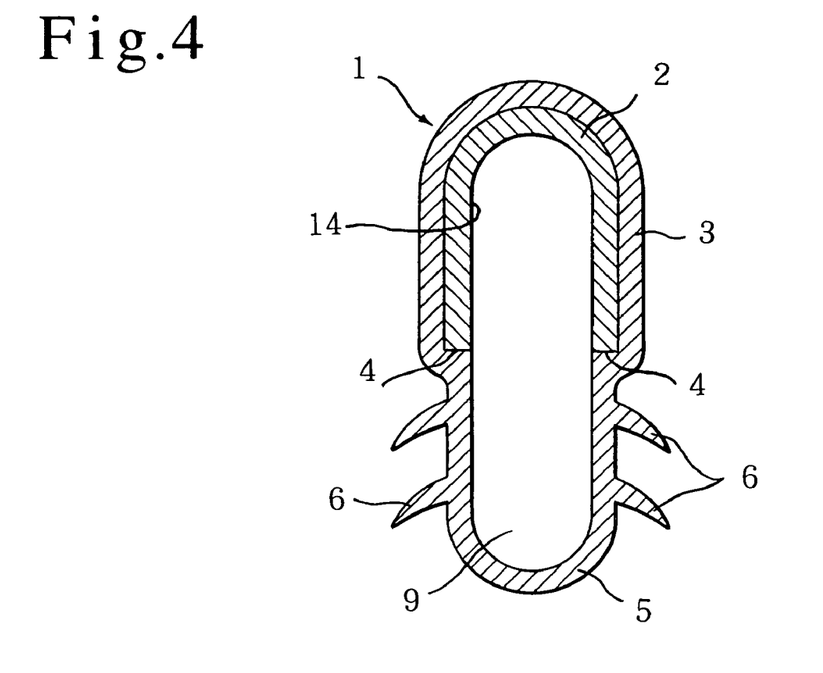
FIG. 4 is a sectional view of a first embodiment of an automotive extrusion-molded product in accordance with the present invention.

FIG. 4 shows an extrusion-molded product of a first embodiment in accordance with the present invention. In the first embodiment, a molded product body 1 has the synthetic resin core material 2 having a U-shaped cross section and a coating body 3, made of a soft synthetic resin or rubber, which is adhered to the whole outer peripheral surface of the core material 2. The coating body 3 is connected to a pushed-in portion 5 having a U-shaped cross section which extends downward beyond the end portions 4, 4 of the core material 2 so as to surround the core material 2 and so as to form a hollow chamber 9 therein. At the outer periphery of the push-in portion 5 having a U-shaped cross section, a plurality of holding members 6 are projectingly provided so as to be symmetrical.

Figure 5:
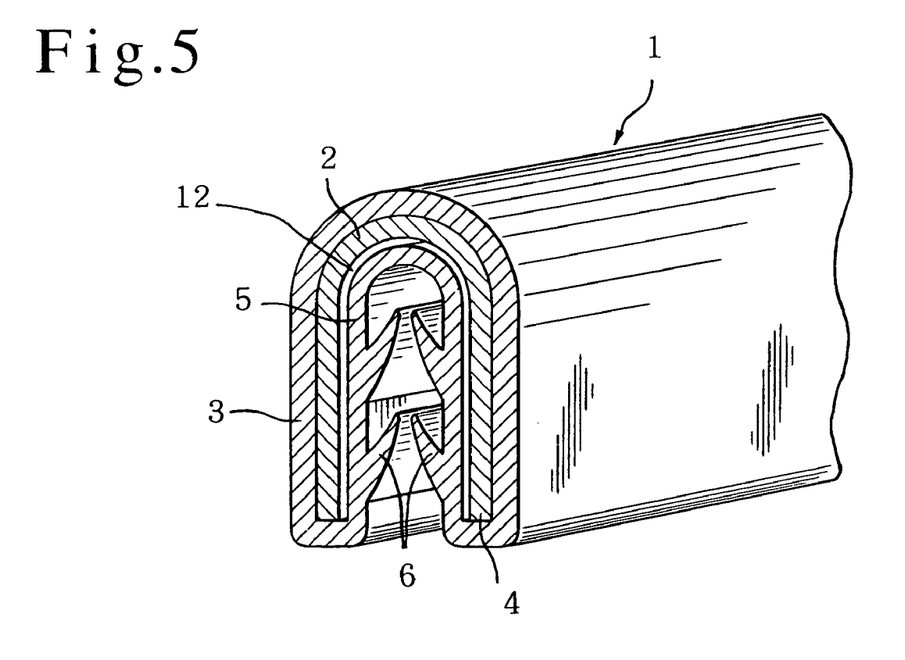
FIG. 5 is a perspective view of the extrusion-molded product shown in FIG. 4, showing a state at the time of usage in which a pushed-in portion is pushed onto an inner peripheral surface having a U-shaped cross section of a core material.

At the time of usage, the push-in portion 5 can be pushed in toward the inner peripheral surface 14 of the core material 2 having a U-shaped cross section as shown in FIG. 5. When the push-in portion 5 is pushed in toward the inner peripheral surface 14 having a U-shaped cross section of the core material 2, a gap 12 is formed between the pushed-in portion 5 and the core material 2, and the holding members 6 are arranged so as to oppose each other within a space formed by the inner peripheral surface 14 of the core material 2 as shown in FIG. 5. Therefore, the holding members 6, 6 formed in the push-in portion 5 are located so as to have a narrow spacing therebetween within a space formed by the inner peripheral surface 14 of the core material 2 and to oppose each other, so that the holding members 6, 6 can firmly hold a flange provided at a vehicle body opening of an automobile by surely pressing the flange from both sides.

The molded product body 1 in accordance with the present invention can be manufactured as follows. First, the core material 2 made of a hard synthetic resin is extrusion-molded into a U shape in the cross section, cut portions 7, 8 having various shapes are punched out from the synthetic resin core material 2 having a U-shaped cross section, and then the coating body 3, the push-in portion 5, and the holding members 6, which are made of a soft synthetic resin or rubber, are extrusion-molded integrally on the core material 2.

Figure 6:
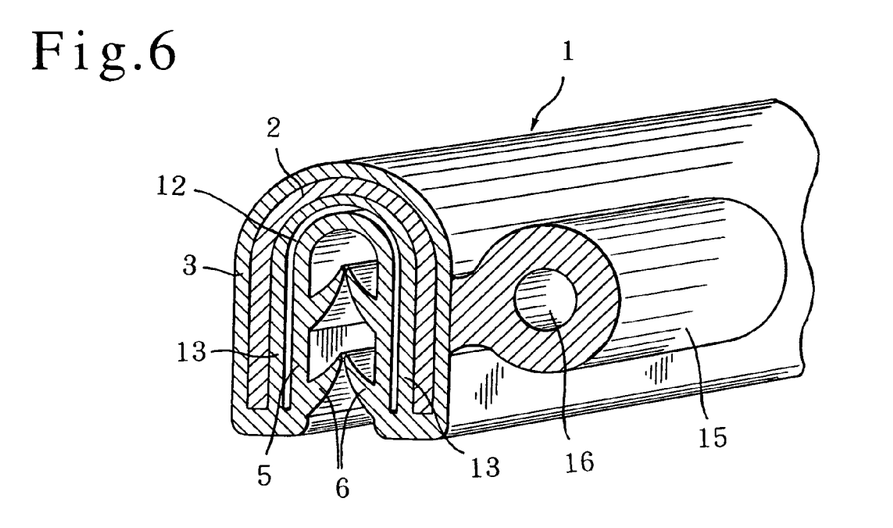
FIG. 6 is a perspective view showing a state at the time of usage of a second embodiment of an automotive extrusion-molded product in accordance with the present invention.
Figure 7:
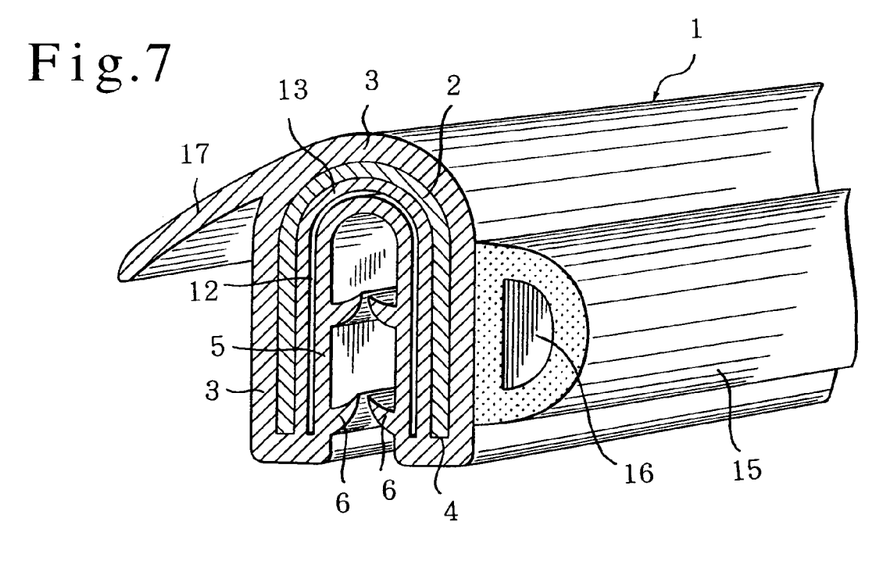
FIG. 7 is a perspective view showing a state at the time of usage of a modification of the extrusion-molded product shown in FIG. 6.

In an extrusion-molded product of a second embodiment shown in FIGS. 6 and 7, the molded product body 1 has the coating body 3 adhered to the outer peripheral surface of the synthetic resin core material 2 and an inner coating body 13 adhered to the inner peripheral surface of the synthetic resin core material 2. The coating bodies 3 and 13 are connected to the push-in portion 5 having a U-shaped cross section, and the push-in portion 5 is provided with the holding members 6 projectingly provided so as to be symmetrical. As shown in FIGS. 6 and 7, the molded product body 1 has an expanded portion 15 having a hollow portion 16 for providing a buffering operation or sealing operation, which is provided on the outer peripheral surface of the molded product body 1. Also, as shown in FIG. 7, a lip portion 17 for decoration is provided on the outer peripheral surface opposite to the expanded portion 15.

In FIGS. 6 and 7 showing a state at the time of usage in which the push-in portion 5 having the holding members 6, 6 is pushed into a space formed by the inner peripheral surface 14 of the core material 2 having a U-shaped cross section. The gap 12 is formed between the outer peripheral surface of the push-in portion 5 and the coating body 13 adhered to the inner peripheral surface 14 of the core material, and the holding members 6, 6 formed in the push-in portion 5 are located so as to have a narrow spacing therebetween within the space formed by the inner peripheral surface 14 of the core material 2 and so as to be opposed to each other.

Figure 8:
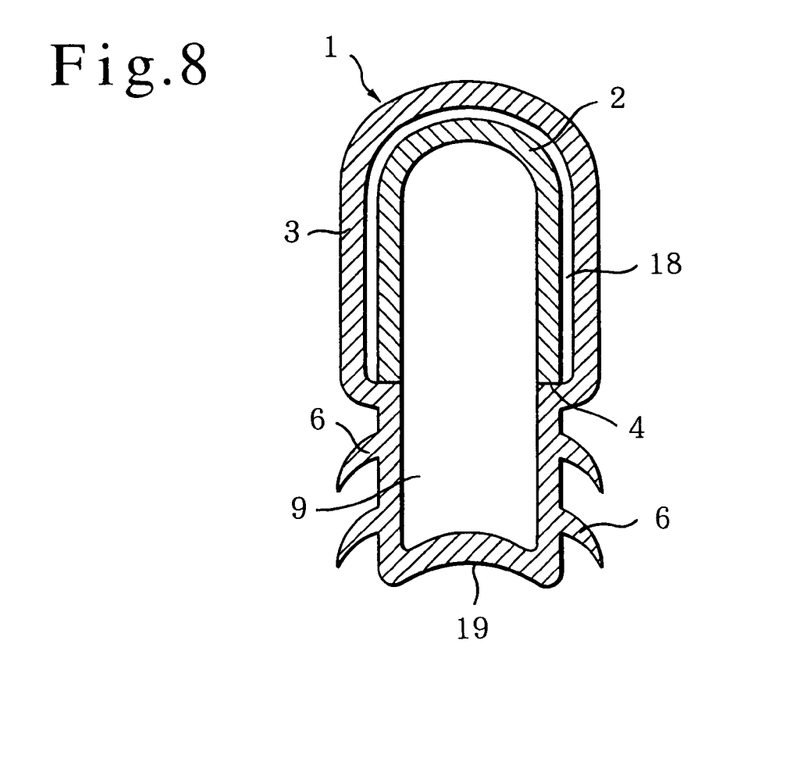
FIG. 8 is a sectional view of a third embodiment of an automotive extrusion-molded product in accordance with the present invention.

In an extrusion-molded product of a third embodiment shown in FIG. 8, the molded product body 1 has the coating body 3 having a U-shaped cross section which is adhered only to a part of the core material 2 having a U-shaped cross section, (that is, only to both end portions 4, 4), and a non-adhering portion 18 is provided between the outer peripheral surface of the core material 2 and the inner peripheral surface of the coating body 3. Further, the push-in portion 5 having a U-shaped cross section is provided with a convex portion 19 so that the push-in portion 5 is easily pushed into the space formed by the inner peripheral surface 14 of the core material 2.

Figure 9:
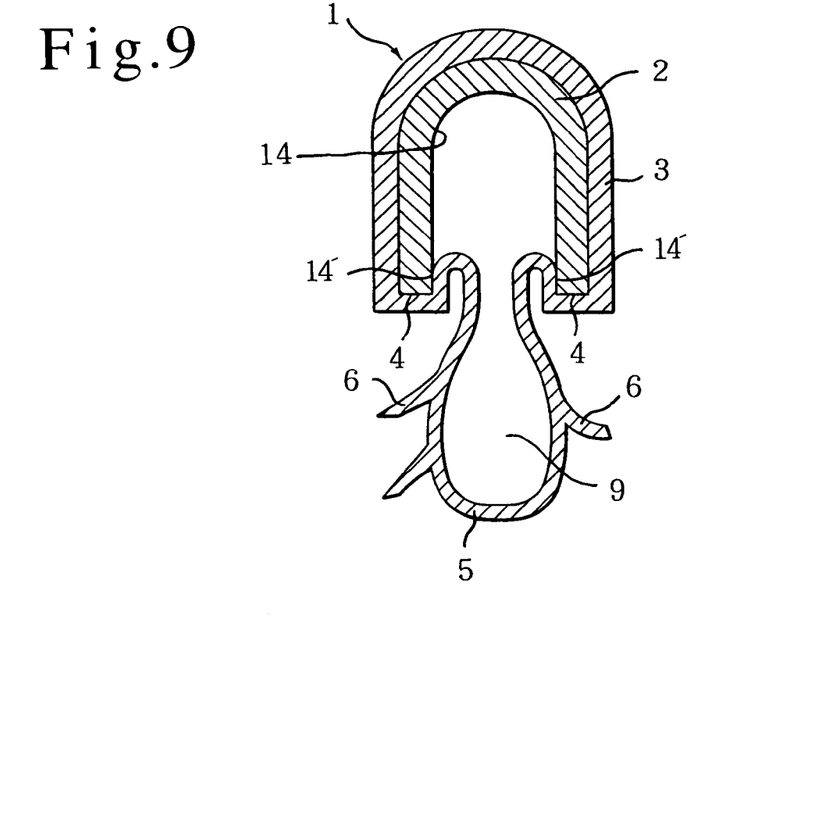
FIG. 9 is a sectional view of a fourth embodiment of an automotive extrusion-molded product in accordance with the present invention.
Figure 10:
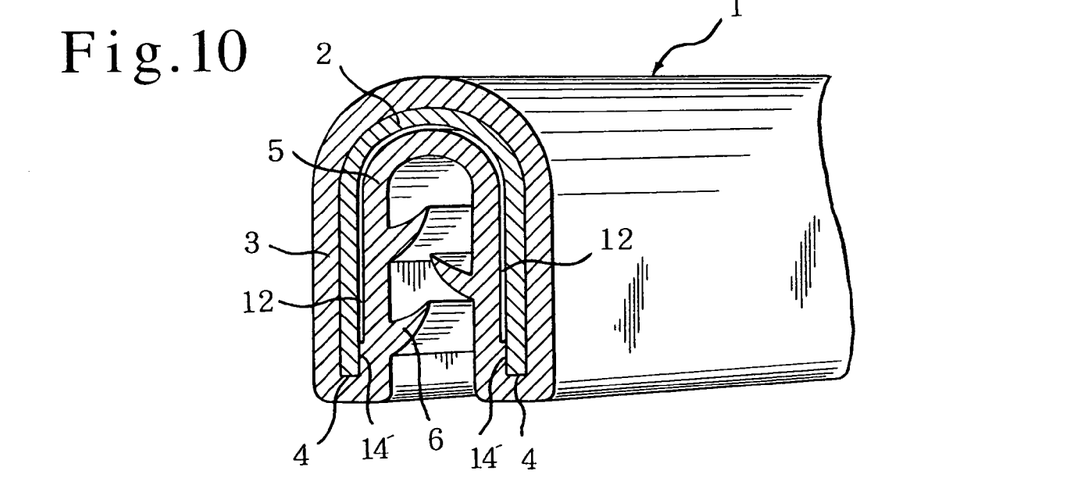
FIG. 10 is a perspective view of the extrusion-molded product shown in FIG. 9 in a state at the time of usage.

In an extrusion-molded product of a fourth embodiment shown in FIGS. 9 and 10, the molded product body 1 has the coating body 3 adhered to the whole of the outer peripheral surface of the core material having a U-shaped cross section and a coating body 14' adhered only to a part of the inner peripheral surface 14, that is, only both lower end portions. Further, the push-in portion 5 is provided with holding members 6 that are arranged asymmetrically and different in size. When the push-in portion 5 is pushed into the space formed by the inner peripheral surface 14 of the core material 2 having a U-shaped cross section, as shown in FIG. 10, the gap 12 is formed between the push-in portion 5 and the inner peripheral surface 14 of the core material 2, and the holding members 6, 6 are located so as to have a narrow spacing therebetween within the space formed by the inner peripheral surface 14 of the core material 2 and so as to oppose each other.

Figure 11:
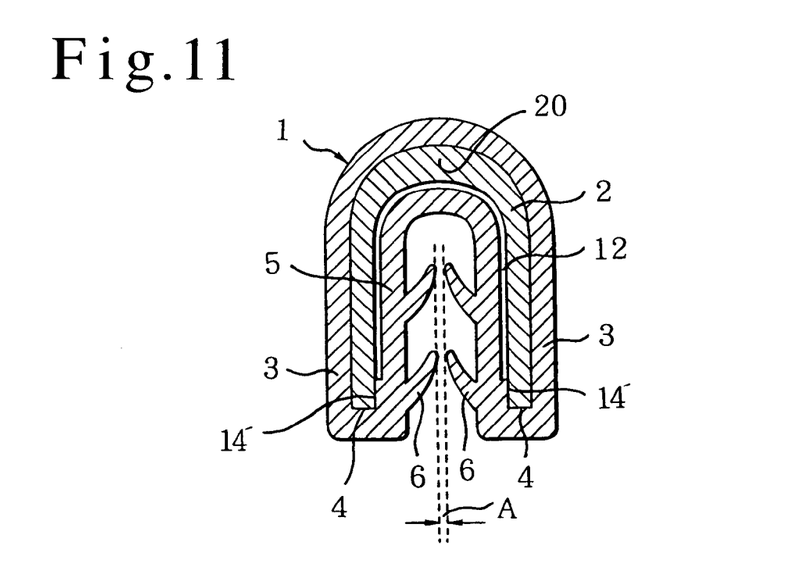
FIG. 11 is a sectional view showing a state at the time of usage of a modification of the extrusion-molded products shown in FIGS. 9 and 10.

FIG. 11 shows a modification of the extrusion-molded product shown in FIGS. 9 and 10. In the modification shown in FIG. 11, the molded product body 1 has a thick-wall portion 20 in which the synthetic resin core material 2 having a U-shaped cross section has a different thickness.

Figure 12:
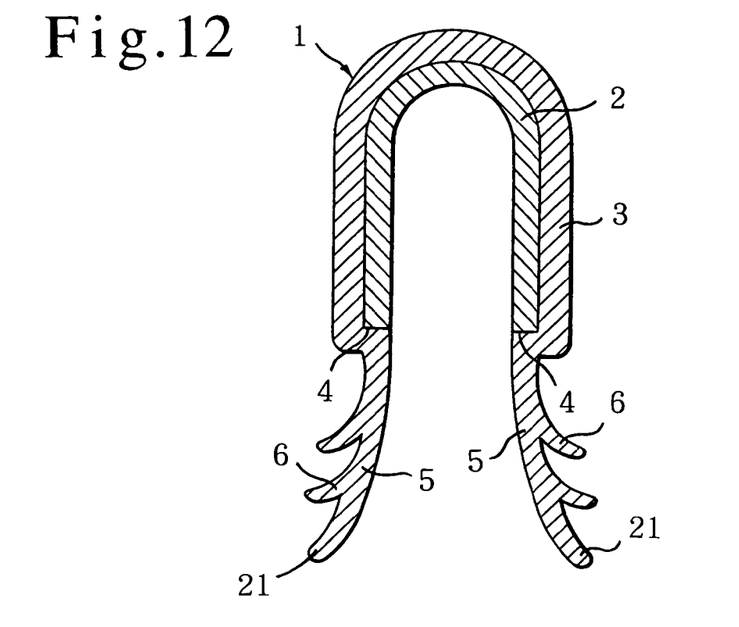
FIG. 12 is a sectional view of a fifth embodiment of an automotive extrusion-molded product in accordance with the present invention.
Figure 13:
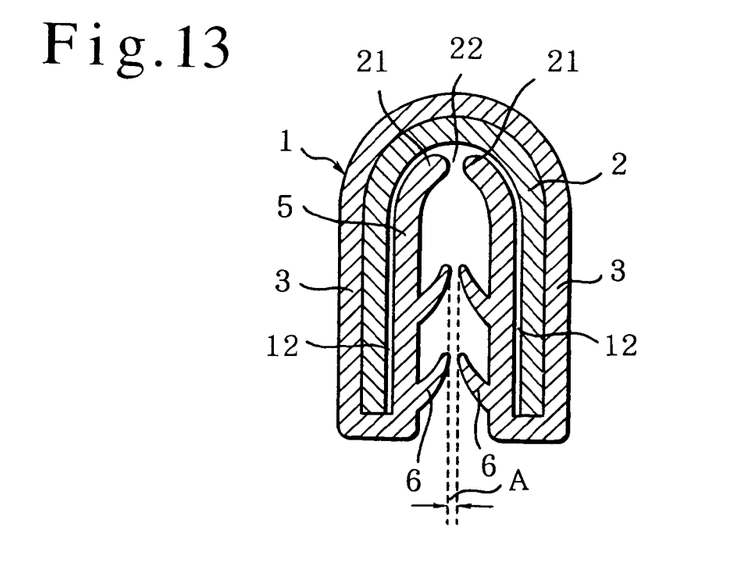
FIG. 13 is a sectional view of the extrusion-molded product shown in FIG. 12 in a state at the time of usage.

In an extrusion-molded product of a fifth embodiment shown in FIGS. 12 and 13, the molded product body 1 has two divided push-in portions 5, 5 each having a tip end portion 21. The two divided push-in portions 5, 5 are formed by cutting the push-in portion 5, which is connected to the coating body 3 adhered to the outer peripheral surface of the synthetic resin core material 2 having a U-shaped cross section, at a middle position between the end portions 4, 4 of the core material 2. When the tip end portions 21, 21 of the two divided push-in portions 5, 5 are pushed in toward the inner peripheral surface 14 of the core material 2 having a U-shaped cross section, the molded product body 1 achieves a state at the time of usage as shown in FIG. 13. In this state, a gap 22 is fotmed between the tip end portions 21, 21 of the two divided push-in portions 5, 5, and the gap 12 is formedbetween the outer peripheral surface of the divided push-in portion 5, 5 and the inner peripheral surface 14 of the core material 2. The holding members 6, 6 formed on the two push-in portions 5, 5 are located so as to have a narrow spacing A therebetween within the space formed by the inner peripheral surface 14 of the core material 2 and so as to oppose each other.

Figure 14:
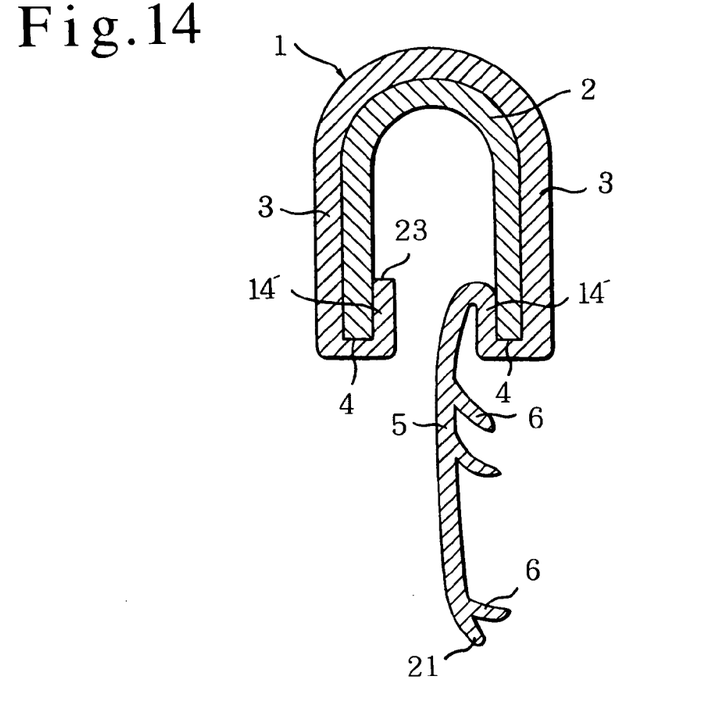
FIG. 14 is a sectional view of a sixth embodiment of an automotive extrusion-molded product in accordance with the present invention.
Figure 15:
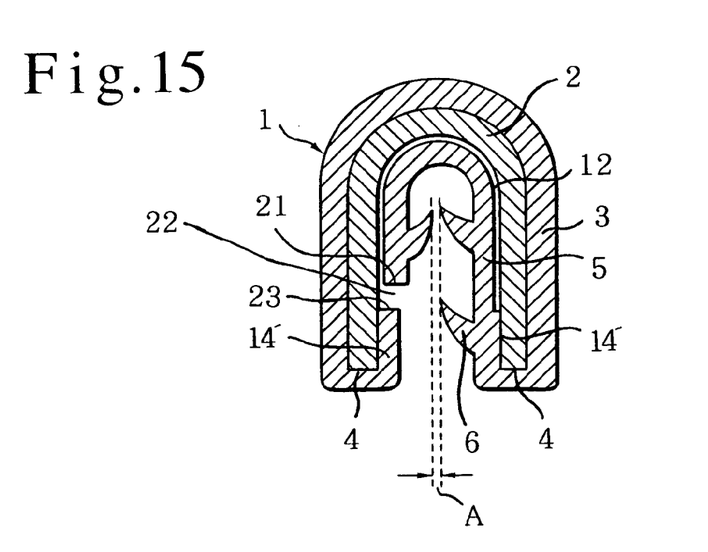
FIG. 15 is a sectional view of the extrusion-molded product shown in FIG. 14 in a state at the time of usage.

In an extrusion-molded product of a sixth embodiment shown in FIGS. 14 and 15, the molded product body 1 has the coating body 3 adhered to the outer peripheral surface of the synthetic resin core material 2 having a U-shaped cross section and coating bodies 14', 14' adhered to the lower end portions of the inner peripheral surface 14 of the core material 2. Only one coating body 14' adhered to the lower end portion of the inner peripheral surface 14 of the core material 2 is connected to a pushed-in portion 5 having the holding members 6, 6. When the tip end portion 21 of the pushed-in portion 5 connected to one coating body 14' is pushed into the space formed by the inner peripheral surface 14 having a U-shaped cross section of the core material 2 toward a connecting portion 23 of the other coating body 14', the molded product body 1 achieves a state at the time of usage as shown in FIG. 15. In this state, the gap 22 is formed between the tip end portion 21 of the push-in portion 5 connected to one coating body 14' and the other coating body 14', and the gap 12 is formed between the push-in portion 5 and the inner peripheral surface 14 of the core material 2. The holding members 6, 6 formed in the push-in portion 5 are located so as to have the narrow spacing A therebetween within the space formed by the inner peripheral surface 14 of the core material 2 and so as to oppose each other.

Figure 16:
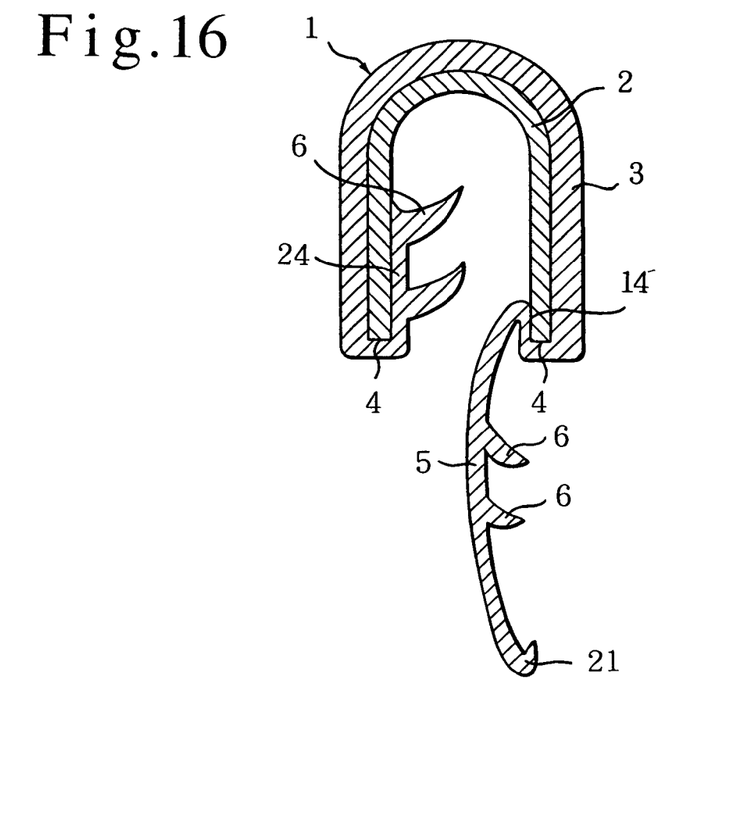
FIG. 16 is a sectional view of a seventh embodiment of an automotive extrusion-molded product in accordance with the present invention.
Figure 17:
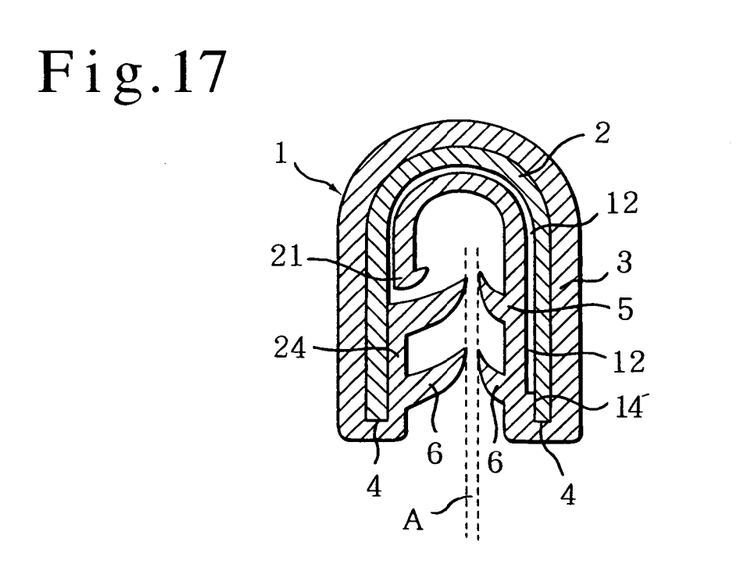
FIG. 17 is a sectional view of the extrusion-molded product shown in FIG. 16 in a state at the time of usage.

In an extrusion-molded product of a seventh embodiment shown in FIGS. 16 and 17, the molded product body 1 has the coating body 3 adhered to the outer peripheral surface of the synthetic resin core material 2 having a U-shaped cross section and an inner peripheral coating body 24 which is put in one lower end portion of the inner peripheral surface 14 of the core material 2. The coating body 14' adhered to the other lower end portion of the inner peripheral surface 14 of the core material 2 is connected to the push-in portion 5 having the holding members 6. The inner peripheral coating body 24 is integrally formed with a plurality of holding members 6 having a size different from the size of the holding members 6 formed on the push-in portion 5. When a tip end portion 21 of the push-in portion 5 is pushed in toward the inner peripheral surface 14 of the core material 2, the molded product body 1 achieves a state at the time of usage as shown in FIG. 17. In this state, the holding members 6 formed on the push-in portion 5 and the holding members 6 formed on the inner peripheral coating body 24 are located so as to have the narrow spacing A therebetween within the space formed by the inner peripheral surface 14 of the core material 2 and so as to oppose each other.

Figure 18:
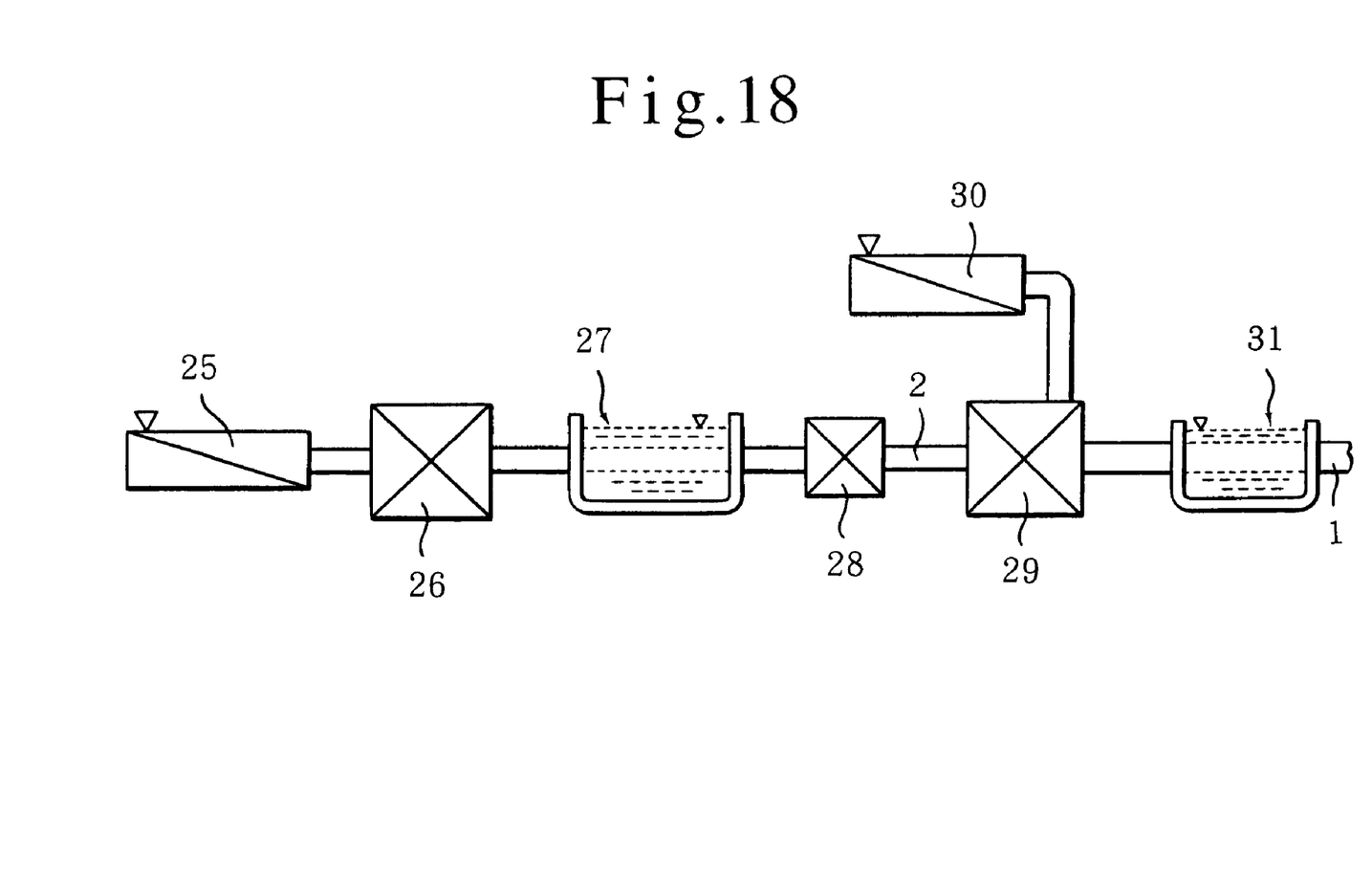
FIG. 18 is a side view showing a manufacturing process for an automotive extrusion-molded product in accordance with the present invention.

Next, a manufacturing process for an automotive extrusion-molded product in accordance with the present invention will be explained with reference to an embodiment shown in FIG. 18. The synthetic resin core material 2 having a U shape in the cross section is extrusion-molded in a first die 26 by using a first extruder 25 into which a hard synthetic resin is poured, and the synthetic resin core material 2 is cooled by being caused to pass through a cooling tank 27. Next, the cut portions 7, 8 having various shapes are punched out from the synthetic resin core material 2 having a U-shaped cross section by using a punching machine 28, and subsequently the synthetic resin core material 2 having the cut portions 7, 8 is carried to a second die 29. In the second die 29, the coating body 3, the push-in portion 5 connected to the coating body, and holding members 6 projectingly provided at the outer periphery of the push-in portion 5 are integrally extrusion-molded on the synthetic resin core material 2 having the cut portions 7, 8 by using a second extruder 30 into which a soft synthetic resin is poured. Finally, the molded product body 1 is carried to a cooling tank 31, by which the manufacture of an automotive extrusion-molded product in accordance with the present invention is completed.

Regarding the automotive extrusion-molded product in accordance with the present invention, as the hard synthetic resin for forming the synthetic resin core material having a U-shaped the cross section, olefin resins such as polypropylene and polyethylene, styrene resins, nylon resins, polyester resins, or polycarbonate resins are used. When the rigidity and heat resistance of hard synthetic resin of the core material 2 are improved and the linear expansion coefficient thereof is decreased, a mixed synthetic resin in which inorganic powder such as talc, mica, and glass fiber is mixed with the hard synthetic resin is used.

As the soft synthetic resin forming the coating body 3, olefin resins or styrene resins with a hardness not higher than 90 (JIS K7215 A hardness) or thermoplastic elastomer thereof is used. Alternatively, vinyl chloride or rubber can be used.

In the method for manufacturing the automotive extrusion-molded product in accordance with the present invention, an explanation has been given of the method in which the push-in portion 5 and the holding members 6 are manufactured out of the same soft synthetic resin as that of the coating body 3 by using one second extruder 30. However, when the hardness or type of material of the pushed-in portion 5 and the holding members 6 is changed to obtain a desired function and quality, polymerization extrusion-molding can be accomplished by using two or three second extruders 30 in the second die 29.

For the automotive extrusion-molded product in accordance with the present invention, the holding members having a desired shape can be disposed easily and surely in a narrow space formed by the inner peripheral surface of the core material having a U-shaped cross section. Also, since the holding members are located so as to have a narrow spacing therebetween within the space formed by the inner peripheral surface of the core material and so as to oppose each other, a flange provided at a vehicle body opening of an automobile can be held firmly from both sides. Further, in the manufacturing method for the automotive extrusion-molded product in accordance with the present invention, the pushed-in portion having the holding members can be extrusion-molded integrally with the coating body, so that the extrusion-molded product can be manufactured easily at a low cost.

What is claimed is:

1. An automotive extrusion-molded product to be used at a vehicle body opening of an automobile, comprising:
   a core material having a U-shaped cross section and made of a hard synthetic resin, said core material having cut portions of various shapes spaced apart along the lengthwise direction of said core material;
   a coating body made of a soft synthetic resin or rubber, said coating body being adhered to said core material so as to cover said synthetic resin core material having a U-shaped cross section;
   a push-in portion formed integrally with said coating body and extending downwardly beyond an end portion of said core material, said push-in portion being shaped and arranged to be pushed in toward an inner peripheral surface of said core material; and
   a plurality of holding members formed integrally with said push-in portion and arranged to symmetrically or unsymmetrically oppose each other within a space formed by said inner peripheral surface of said core material when said push-in portion is pushed into the space formed by said inner peripheral surface of said core material.

2. The automotive extrusion-molded product of claim 1, wherein said coating body is adhered to at least a portion of an outer peripheral surface of said core material.

3. The automotive extrusion-molded product of claim 2, wherein said coating body covering said core material is connected to said push-in portion so as to form a hallow chamber.

4. The automotive extrusion-molded product of claim 2, wherein said coating body is adhered to at least a portion of an outer peripheral surface of said core material and a lower end portion of said inner peripheral surface of said core material, said coating body adhered to said lower end portion of said inner peripheral surface being connected to said push-in portion.

5. The automotive extrusion-molded product of claim 2, wherein said push-in portion is divided into two separate push-in portions each connected to said coating body covering said core material.

6. The automotive extrusion-molded product of claim 1, wherein said coating body is adhered to an entirety of said inner peripheral surface and an outer peripheral surface of said core material.

7. The automotive extrusion-molded product of claim 6, wherein said coating body covering said core material is connected to said push-in portion so as to form a hollow chamber.

8. The automotive extrusion-molded product of claim 6, wherein said coating body is adhered to at least a portion of an outer peripheral surface of said core material and a lower end portion of said inner peripheral surface of said core material, said coating body adhered to said lower end portion of said inner peripheral surface being connected to said push-in portion.

9. The automotive extrusion-molded product of claim 6, wherein said push-in portion is divided into two separate push-in portions each connected to said coating body covering said core material.

10. The automotive extrusion-model product of claim 1, wherein said coating body is adhered to a portion of said core material.

11. The automotive extrusion-molded product of claim 10, wherein said coating body covering said core material is connected to said push-in portion so as to form a hollow chamber.

12. The automotive extrusion-molded product of claim 10, wherein said coating body is adhered to at least a portion of an outer peripheral surface of said core material and a lower end portion of said inner peripheral surface of said core material, said coating body adhered to said lower end portion of said inner peripheral surface being connected to said push-in portion.

13. The automotive extrusion-molded product of claim 10, wherein said push-in portion is divided into two separate push-in portions each connected to said coating body covering said core material.

14. The automotive extrusion-molded product of claim 1, wherein said coating body covering said core material is connected to said push-in portion so as to form a hollow chamber.

15. The automotive extrusion-molded product of claim 14, wherein said coating body is adhered to at least a portion of an outer peripheral surface of said core material and a lower end portion of said inner peripheral surface of said core material, said coating body adhered to said lower end portion of said inner peripheral surface being connected to said push-in portion.

16. The automotive extrusion-molded product of claim 1, wherein said coating body is adhered to at least a portion of an outer peripheral surface of said core material and a lower end portion of said inner peripheral surface of said core material, said coating body adhered to said lower end portion of said inner peripheral surface being connected to said push-in portion.

17. The automotive extrusion-molded product of claim 10, wherein said push-in portion is divided into two separate push-in portions each connected to said coating body covering said core material.

18. The automotive extrusion-molded product of claim 1, wherein said coating body is adhered to at least a portion of an outer peripheral surface of said core material and a lower end portion of said inner peripheral surface of said core material, and only a coating body portion adhered to one side of said lower end portion of said inner peripheral surface of said core material is connected to said push-in portion.

19. The automotive extrusion-molded product of claim 18, wherein a first coating body adhered to a first side of said lower end portion of said inner peripheral surface of said core material is connected to said push-in portion, and a second coating body portion adhered to a second side of said lower end portion of said inner peripheral surface of said core material has holding members.

20. The automotive extrusion-molded product of claim 1, wherein said automotive extrusion-molded product comprises one of a trim part, a weather strip, and a window molding.

21. The automotive extrusion-molded product of claim 1, wherein the vehicle body opening comprises one of an automotive door, a trunk, and a window of an automobile.

* * * * *